UNITED STATES PATENT OFFICE.

HARRY L. BOYER, OF TRENTON, NEW JERSEY, ASSIGNOR TO JOSEPH STOKES RUBBER COMPANY, OF TRENTON, NEW JERSEY, A CORPORATION OF NEW JERSEY.

STORAGE-BATTERY SEPARATOR AND METHOD OF PRODUCING SAME.

1,394,466.   Specification of Letters Patent.   Patented Oct. 18, 1921.

No Drawing.   Application filed September 29, 1919.   Serial No. 327,303.

*To all whom it may concern:*

Be it known that I, HARRY L. BOYER, a citizen of the United States, residing at Trenton, in the county of Mercer and State of New Jersey, have invented a certain new and useful Improvement in Storage-Battery Separators and Methods of Producing Same, of which the following is a full, clear, and exact description.

The present invention relates to storage battery separators, especially of the type composed of porous and non-porous portions, such as those known to the trade as the Willard thread rubber separators, and described and claimed in patents granted to T. A. Willard, No. 1,243,368, October 16, 1917, and No. 1,243,370, October 16, 1917.

The object of the invention is to treat the separators in such a way as to increase the efficiency of the battery as a whole, and particularly to cause the capacity of the plates to be maintained.

It has been found that there is a chemical or substance in the form of a natural ingredient in wood which has the effect of increasing, or at least, maintaining the capacity of the plates. Just what this substance is, or how it is liberated, is not known.

In its broad aspect my invention comprises a separator having comminuted wood incorporated therein. In a preferred embodiment of my invention, separators rendered porous by threads or fibers extending therethrough and caused to adhere together by non-porous insulating material such as rubber, preferably the thread rubber separators having the characteristics of and made by the method covered by the before mentioned Willard patents, are treated during the process of making the separators, or in the process of producing the materials utilized in their construction, so that there is incorporated in the separators a material which maintains the capacity of the plates with which the separators are employed. This material is preferably comminuted wood or wood dust, or equivalent material containing at least part of the natural ingredients of wood, which is so placed in the separator that the battery solution will have access to it and thus liberate the substance which maintains or helps to maintain the capacity of the plates.

The desired results may be obtained in different ways, some of which will be described below, but before describing the same, reference will be had briefly to the thread rubber separator and to the preferred method of producing it as carried out at the present time.

In the production of the tread rubber separators, a composite body of rubber and cloth, or other fibrous material is built up to suitable dimensions, is compressed, semi-vulcanized, and then sliced into sections which have a large number of closely associated threads extending from side to side therethrough. Subsequently these sections are subjected to a further vulcanizing process, and generally ribs are applied to one or both faces thereof.

In forming the composite body referred to, cloth in strip form is preferably employed as the porous or pore producing material, and generally the cloth or fabric is rubber frictioned, and is laid layer upon layer until a body of suitable thickness is produced.

Taking up now the step or steps which directly involve my invention, the material which is designed to maintain the capacity of the battery plates may be applied advantageously to the cloth or porous material before it is rubber frictioned. For example, the cloth or porous material may be rendered sticky as by spraying it with a very thin solution of glue, and after receiving the coat of glue it may be passed through a dust box, or the porous material may be sprayed with a thin solution of glue containing the wood dust. By either method the wood dust is uniformly applied in the desired amount.

Instead of proceeding as above, the wood dust could be incorporated in the yarn when it is spun, so that when the cloth is woven, the desired amount of the dust would be incorporated directly in the cloth. For instance, the wood dust could be sifted into the cotton which is spun into the yarn, or it might be applied to the yarn after it is spun.

Another way of carrying out the invention is to apply the wood dust uniformly onto the sticky rubber frictioned cloth before it is placed layer upon layer to form the composite body, in which event both rubber covered surfaces of the cloth are preferably coated with the dust. I have considered also, mixing the wood dust in the rubber or rubber compound before it is used to rubber friction the cloth, but I now believe that the best results are not obtained by this method.

In carrying out my invention, untreated wood or wood dust is preferably employed, that is to say, wood dust containing the natural ingredients of wood. At least it is important that it contain the major portion of its natural ingredients, in addition to cellulose, including of necessity, the substance which is liberated to maintain the capacity of the plates. The wood is first ground very fine, or powdered, preferably to a fineness such that it will pass through an eighty per inch screen, though if the method is employed wherein the wood dust is dusted on or applied as a leyer to the rubber frictioned fabric, it is not necessary that the wood particles be in as fine a state as with the other methods referred to. In fact, it may be desirable in such instance to employ a considerable coarser grain.

I have considered employing instead of the wood dust, some other wood product, such as a distillate wood, but I find that in the latter case, the effects in the way of maintaining the capacity of the battery plates are not lasting, whereas if wood dust is employed, it continues to act throughout the life of the battery.

After the wood dust or equivalent material is applied in any of the ways above explained, or in any other manner which may be found suitable, the separators are completed as by the method briefly referred to above, or as described in the Willard patents, so that when the improved separators are completed, they will have incorporated therein and substantially uniformly distributed throughout the same, the fine wood particles to which, or to a sufficient amount of which, the electrolyte of the battery will have access so as to liberate the substance to effectively maintain the capacity of the plates.

It will be understood that I am not to be limited to the precise materials mentioned as being desirably employed in the production of the separator, nor that I intend to limit my invention so far as the process is concerned, to the steps specifically described, as other ways of carrying out the principle of my invention may be employed as long as they produce the desired results.

Having described my invention, I claim:

1. A storage battery separator having comminuted wood incorporated therein.

2. A storage battery separator having divided wood particles and a binding material incorporated therein.

3. A storage battery separator composed of porous material extending therethrough and held together by an insulating cementitious material, said separator having incorporated therein material to maintain the capacity of the battery plates with which the separator is employed.

4. A storage battery separator consisting of porous material extending from side to side therethrough and an insulating cementitious material, said separator having comminuted wood incorporated therein.

5. A storage battery separator composed chiefly of threads and rubber, with the threads extending transversely through the separator and held together by the rubber, said separator having incorporated therein a substance for maintaining the capacity of the plates with which the separator is employed.

6. A storage battery separator formed of rubber and porous material extending from side to side through the separator, and a material incorporated in the separator so that the battery electrolyte may have access thereto, said material containing at least part of the natural ingredients of wood.

7. The method of forming storage battery separators which comprises forming a composite block containing comminuted wood and a binding material and slicing the block into separator sections.

8. The method of preventing a drop in the capacity of the plates of a storage battery which comprises incorporating in the separators employed in the battery a substance which will maintain the capacity of the plates.

9. The method of maintaining the capacity of the plates of a storage battery separated by separators composed of porous material separated and held together by a cementing agency, which consists in incorporating in the separator so that the battery electrolyte may have access thereto, a substance containing at least part of the natural ingredients of wood.

10. The step in the method of producing storage battery separators by forming a composite body of porous material and insulating cementing material and slicing the body in sections, which step consists in applying to, or incorporating in said body a substance to maintain the capacity of the battery plates with which the separators are employed.

11. The method of producing storage battery separators which consists in forming a composite body of porous and non-porous materials by building up the body layer upon layer, and applying to each layer a substance to maintain the capacity of the battery plates with which the separators are employed, and subsequently slicing said body into separator sections.

12. The method of making storage battery separators which comprises building up a composite body of porous material and a cementitious material, applying to one of the materials a substance to maintain the capacity of the battery plates with which the separators are employed, and subsequently slicing the body into separator sections.

In testimony whereof, I hereunto affix my signature.

HARRY L. BOYER.